(12) United States Patent  (10) Patent No.: US 9,286,231 B2
Vaisanen et al.  (45) Date of Patent: Mar. 15, 2016

(54) APPARATUS, A SYSTEM, A METHOD AND A COMPUTER PROGRAM FOR ERASING DATA STORED ON A STORAGE DEVICE (71) Applicant: BLANCCO OY LTD, Joensuu (FI)

(72) Inventors: Kim Vaisanen, Helsinki (FI); Lauri Lalli, Joensuu (FI); Jonathan Brew, Joensuu (FI)

(73) Assignee: BLANCCO OY LTD., Joensuu (FI)

( * ) Notice: Subject to any disclaimer, the term of this patent is extended or adjusted under 35 U.S.C. 154(b) by 0 days.

(21) Appl. No.: 14/412,788

(22) PCT Filed: Jul. 5, 2013

(86) PCT No.: PCT/FI2013/050738
§ 371 (c)(1),
(2) Date: Jan. 5, 2015

(87) PCT Pub. No.: WO2014/006274
PCT Pub. Date: Jan. 9, 2014

(65) Prior Publication Data
US 2015/0169462 A1    Jun. 18, 2015

(30) Foreign Application Priority Data
Jul. 5, 2012    (FI) .................................... 20125779

(51) Int. Cl.
*G06F 12/00*    (2006.01)
*G06F 12/08*    (2006.01)
(Continued)

(52) U.S. Cl.
CPC ............ *G06F 12/0891* (2013.01); *G06F 21/78* (2013.01); *G06F 21/79* (2013.01); *G06F 2212/7205* (2013.01); *G06F 2221/2143* (2013.01)

(58) Field of Classification Search
CPC ................ G06F 2221/2143; G06F 2212/7205; G06F 12/0891; G06F 21/78; G06F 3/0652; G06F 2221/2107; G06F 21/79; G11C 16/105; G11C 16/16; H04L 2209/30; H03M 7/30
USPC .................................... 711/159, 154, 165, 170
See application file for complete search history.

(56) References Cited

U.S. PATENT DOCUMENTS

2005/0246362 A1* 11/2005 Borland ............ G06F 17/30067
2005/0257017 A1    11/2005 Yagi
(Continued)

OTHER PUBLICATIONS

Michael Wei et al.: "Reliably Erasing Data From Flash-Based Solid State Drives", Feb. 1, 2011 •XP055085941, Retrieved from the Internet: URL:http://citeseerx.ist.psu.edu/viewdoc/download?doi=10.1.1.187.3062&rep=rep1&type=pdf [retrieved on Oct. 29, 2013] cited in the application the whole document.

(Continued)

*Primary Examiner* — Hong Kim
(74) *Attorney, Agent, or Firm* — Young & Thompson (57) ABSTRACT An approach for erasing data being stored in a data storage apparatus is provided. The approach may be provided e.g. as an apparatus, as a method, as a system or as a computer program. The approach comprises obtaining a sequence of uncompressible data fulfilling predetermined criteria, which predetermined criteria comprises a statistical measure indicative of compressibility or uncompressibility of the sequence of uncompressible data meeting a predetermined criterion, wherein the sequence of uncompressible data is divided into one or more blocks of uncompressible data, the sum of the sizes of the one or more blocks of uncompressible data being larger than or equal to the storage capacity of the data storage apparatus, and providing, to the data storage apparatus, the one or more blocks of uncompressible data for storage therein to overwrite the data being currently stored in the data storage apparatus.

24 Claims, 3 Drawing Sheets (51) Int. Cl.
*G06F 21/78* (2013.01)
*G06F 21/79* (2013.01)

(56) References Cited

U.S. PATENT DOCUMENTS

| | | | | |
|---|---|---|---|---|
| 2006/0268125 | A1* | 11/2006 | Teicher | H04N 1/00137 348/231.99 |
| 2007/0116267 | A1* | 5/2007 | Speirs, II | H04L 9/065 380/28 |
| 2011/0066882 | A1* | 3/2011 | Walls | G06F 11/1068 714/6.24 |
| 2011/0107042 | A1* | 5/2011 | Herron | G06F 3/0605 711/161 |
| 2013/0036256 | A1* | 2/2013 | Kawamura | G06F 3/0623 711/103 |
| 2013/0159600 | A1* | 6/2013 | Dror | G06F 12/0246 711/103 |

OTHER PUBLICATIONS

Carlos M Gutierrez et al.: "NIST Special Publication 800-88 Guidelines for Media Sanitization Recommendations of the National Institute of Standards and Technology", Sep. 1, 2006, XP055085946, Retrieved from the Internet: URL:http://csrc.nist.gov/publications/nist pubs/800-88/NISTSP800-88 with-errata. pdf [retrieved on Oct. 29, 2013J tables 5-1.

Li, Ming and Vitanyi, Paul M.B. "Two decades of applied Kolmogorov complexity: in memoriam Andrei Nikolaevich Kolmogorov 1903-87", In: Structure in Complexity Theory Conference, Proceedings, Third Annual. IEEE, 1988, p. 80-101 section 2.1.

Hertsens Jan. "uncompressable" data sequence' (3rd answer, 1st comment), in Stack Overflow (Online question and answer site) [online]. Feb. 11, 2012;0:00 [retrieved on Apr. 24, 2013]. Retrieved from the Internet: <URL:http://stackoverflow.com/questions/9185289/uncompressable-data-sequence>.

Andrew Rukhin et al.: "A statistical test suite for random and pseudorandom No. generators for cryptographic applications", Revised Apr. 2010, National Institute of Standards and Technology, Technology Administration, U.S. Department of Commerce, Special Publication 800-22, Revision 1a.

FI Search Report, dated May 2, 2013, from corresponding FI application.

International Search Report, dated Nov. 8, 2013, from corresponding PCT application.

* cited by examiner

APPARATUS, A SYSTEM, A METHOD AND A COMPUTER PROGRAM FOR ERASING DATA STORED ON A STORAGE DEVICE

TECHNICAL FIELD

The invention relates to a method, to an apparatus, to a system and to a computer program for erasing data stored on a storage device. In particular, example embodiments of the invention relates to a method, an apparatus, a system and a computer program for erasing the data stored on an SSD storage device in a reliable manner.

BACKGROUND

Areas that require high levels of security i.e. government or military institutions, require an approach for securely erasing data from storage devices in such a way that it is not retrievable by a specified level of threat agent. Private businesses and other users can also retain a motivation to ensure that sensitive information is not made accessible to others through the inadequate removal of data from a non-volatile memory. Additionally, the continued adoption of privacy and data protection legislation implies that there is an increasing shift toward erasing personal or sensitive information in a secure manner.

A commonly used way to securely prevent data recovery from a storage device such as a magnetic hard disk or a USB pen drive is to overwrite all of the addressable parts of the disk at least once using a predetermined overwriting pattern. Many standards for such overwriting of data exist and these standards are based on the differing security requirements of national and/or military institutions and interpretation of the perceived level of security required for the information, e.g. "Top Secret" or "Classified". Overwriting of data in most cases enables the continued use of the storage device after the erasure process, which represents more value as an asset with continued use than physically destroying the disk.

Over the last few years developments in storage technology have brought Solid State Drives (SSDs) to mass market. Unlike standard magnetic hard drives, SSDs are, typically, NAND flash-based semiconductor devices that do not rely on moving parts. Since SSDs have not been in existence for very long, a transition period in the development of their security aspects and the uniform standards required to control the drives is still ongoing. As an example, empirical data published in a recent study from Wei et al., entitled "Reliably Erasing Data From Flash-based Solid State Drives", concluded that not all SSD manufacturers have succeeded in the full implementation of the relative command set (i.e. SCSI or ATA) for SSDs, thereby possibly causing vulnerability in security of data through the inconsistent success of the data erasure command(s).

SUMMARY

It is an object of the present invention to provide an approach for efficiently and reliably erasing the content stored in a data storage device, such as a SSD drive.

According to a first aspect of the present invention, an apparatus for erasing data being stored in a data storage apparatus is provided, the apparatus comprising a data provision portion configured to obtain a sequence of uncompressible data fulfilling predetermined criteria, wherein the sequence of uncompressible data is divided into one or more blocks of uncompressible data, the sum of the sizes of the one or more blocks of uncompressible data being larger than or equal to the storage capacity of the data storage apparatus, and a data writing portion configured to provide, to the data storage apparatus, the one or more blocks of uncompressible data for storage therein to overwrite the data being currently stored in the data storage apparatus.

According to a second aspect of the present invention, an apparatus for erasing data being stored in a data storage apparatus is provided, the apparatus comprising at least one processor and at least one memory including computer program code for one or more programs, the at least one memory and the computer program code configured to, with the at least one processor, cause the apparatus at least to obtain a sequence of uncompressible data fulfilling predetermined criteria, wherein the sequence of uncompressible data is divided into one or more blocks of uncompressible data, the sum of the sizes of the one or more blocks of uncompressible data being larger than or equal to the storage capacity of the data storage apparatus, and to provide, to the data storage apparatus, the one or more blocks of uncompressible data for storage therein to overwrite the data being currently stored in the data storage apparatus.

According to a third aspect of the present invention, a system for erasing data being stored in a data storage apparatus, the system comprising an eraser apparatus according to first or second aspect of the invention and the data storage apparatus configured to apply compression to the one or more blocks of uncompressible data to provide corresponding one or more blocks of compressed data, wherein, for each of the one or more compressed blocks of data, the size of a block of compressed data is no smaller than the size of the corresponding block of uncompressible data, and to store the one or more blocks of compressed data in a physical memory.

According to a fourth aspect of the present invention, a method for erasing data being stored in a data storage apparatus is provided, the method comprising obtaining a sequence of uncompressible data fulfilling predetermined criteria, wherein the sequence of uncompressible data is divided into one or more blocks of uncompressible data, the sum of the sizes of the one or more blocks of uncompressible data being larger than or equal to the storage capacity of the data storage apparatus, and providing, to the data storage apparatus, the one or more blocks of uncompressible data for storage therein to overwrite the data being currently stored in the data storage apparatus.

According to a fifth aspect of the present invention, a computer program is provided, the computer program including one or more sequences of one or more instructions which, when executed by one or more processors, cause an apparatus at least to perform the method according to the fourth aspect of the invention.

The computer program may be embodied on a volatile or a non-volatile computer-readable record medium, for example as a computer program product comprising at least one computer readable non-transitory medium having program code stored thereon, the program which when executed by an apparatus cause the apparatus at least to perform the method according to the fourth aspect of the invention.

Across all aspects of the present invention, the sequence of uncompressible data fulfilling the predetermined criteria may comprise a statistical measure indicative of compressibility or uncompressibility of the sequence of uncompressible data meeting a predetermined criterion.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

The novel features which are considered as characteristic of the invention are set forth in particular in the appended claims. The invention itself, however, both as to its construction and its method of operation, together with additional objects and advantages thereof, will be best understood from the following detailed description of specific embodiments when read in connection with the accompanying drawings.

DETAILED DESCRIPTION

Figure 1:
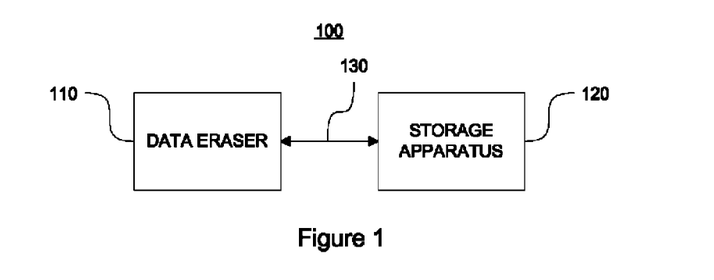
FIG. 1 schematically illustrates an arrangement in accordance with embodiments of the invention.

FIG. 1 schematically illustrates an exemplifying arrangement 100 comprising a data eraser 110 connected to a data storage apparatus 120. The data eraser 110 is configured to provide information, e.g. write data, to the data storage apparatus 120 and the data eraser 110 may be configured to receive information, e.g. read data, from the data storage apparatus 120. The data eraser 110 may be connected to the data storage apparatus via a host interface 130 defining the communication and/or data transfer protocol(s) between the data storage apparatus 120 and an entity connected thereto, e.g. the data eraser 110.

The host interface 130 may comprise an interface according to a respective standard known in the art, for example according to Serial AT Attachment (SATA), Parallel ATA (PATA), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe) or any corresponding interface suitable for communication and data transfer between the data storage device 120 and another entity.

Figure 2:
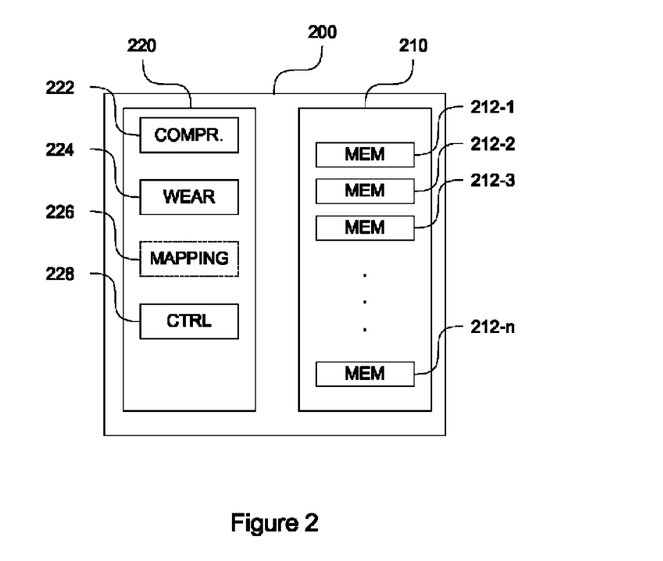
FIG. 2 schematically illustrates a data storage apparatus.

FIG. 2 schematically illustrates a solid-state drive (SSD) device 200 as an example of the data storage apparatus 120. The SSD device 200 comprises a storage portion 210 and a control portion 220.

The storage portion 210 comprises one or more storage cells 212-1, 212-2, 212-3 . . . , 212-n providing physical storage capacity, for example one or more NAND flash chips or one or memory chips of other type providing non-volatile storage of data. Each memory chip may enable storing a predetermined amount of data, the sum of which defining the overall physical storage capacity of the SSD device 200.

The control portion 220 is configured to control writing data to the storage portion 210 and reading data from the storage portion 210. The control portion 220 typically comprises a data compressor 222 and a wear leveling portion 224. However the SSD device 200 may also be provided without the data compressor 222.

The data compressor 222, if present, may be configured to compress data to be written in the SSD device 200 and to decompress data to be read from the SSD device 200. In particular, the data compressor 222 may be configured to apply lossless compression to the data to be written in the SSD device 200 in accordance with a predetermined compression approach and to apply corresponding decompression to the data read from the SSD device 200. Such a compression approach typically makes use of inherent redundancy of a block of data to be written in the SSD device 200 and hence the compression performance typically depends on characteristics of the data to be written in the SSD device 200. A number of suitable compression approaches and corresponding decompression approaches are known in the art. Compression of the data to be written in the SSD device 220 serves to reduce the amount of data to be actually written in the physical memory provided by the one or more storage cells 212-1, 212-2, 212-3, . . . , 212-n.

The wear leveling portion 224 is configured to distribute the units of a compressed block of data, e.g. bytes or words, across the one or more storage cells 212-1, 212-2, 212-3, . . . , 212-n according to a predetermined set of rules. Hence, the wear leveling portion 224 is configured to determine the physical memory addresses for storing the units of the compressed block of data according the set of predetermined rules. Such a set of predetermined rules are employed to dynamically manage the usage of the physical memory addresses, typically aiming to evenly employ the one or more storage cells 212-1, 212-2, 212-3, . . . , 212-n of the storage portion 210 over time. In particular, a set of predetermined rules may attempt to keep the cumulative number of writes to any storage cell of the storage portion 210 to a minimum in consideration of the number writes to all storage cells of the storage portion 210. As an example, in order to write N units of compressed data requiring usage of M storage cells, the wear leveling portion 228 may be configured—conceptually—to order the storage cells in an increasing order of number of writes thereto applied so far and to select the M first storage cells of the ordered list for storing the N units of compressed data. Such even employment of the storage cells serves to prolong the lifetime of the SSD device 200 due to the reliability of certain types of storage cells, e.g. NAND flash chips, degrading with increasing number of writes thereto.

The functions provided by the data compressor 222 and the wear leveling portion 224 may be considered as a translation from a logical memory address in the interface to the SSD device 200 to a corresponding physical memory address in the storage portion 210. Consequently, the data compressor 222 and the wear leveling portion 224 may be considered to provide a single entity that provides a mapping between a logical memory address and a corresponding physical memory address. Such entity may be referred to as a translation portion, as a data translation portion, as a (flash) translation layer, etc.

The translation portion may make use of a mapping table 226 or other suitable data structure in providing the mapping between a logical memory address and a corresponding physical memory address, e.g. by keeping track of each occupied logical memory address and the corresponding physical memory address. The mapping table 226 may further provide indication of occupied and/or unoccupied logical and/or physical memory addresses to facilitate efficient usage of the storage portion 210. The mapping table 226 may be provided in a memory comprised in the control portion 220 and/or in a memory elsewhere in the SSD drive 200 accessible by the translation portion. In particular, one or more of the one or more storage cells 212-1, 212-2, 212-3, . . . , 212-n may be employed to provide non-volatile storage for the mapping table (or a corresponding data structure). In particular, the mapping table 226 may be stored in the storage portion when the SSD device 200 is not in operation—e.g. when not switched on or when operating power is not supplied thereto—whereas the mapping table 226 may be stored in a memory provided in the control portion 220 to enable efficient access thereto when the SSD device 200 is in operation.

The translation portion further comprises a controller 228 for controlling the operation of the data compressor 222 and the wear leveling portion 224, as well as for providing an interface towards an entity using the SSD device 200, e.g. the host interface 130 for receiving commands and data to be written in the SSD device 200 or read from the SSD device 200. In particular, in response to an instruction or command to write a block of data into a logical memory address of the SSD device 200, the controller 228 may be configured to cause the compressor 222 to compress the block of data into a compressed block of the block of data to be written in the storage portion 210, to cause the wear leveling portion 224 to determine the storage cells, i.e. the physical memory address(es) to be used for storing the compressed block of data, to cause writing the compressed block of data to the determined physical memory address(es), and to update the mapping table 226 accordingly.

Similarly, in response to an instruction or command to read a block of data from a logical memory address of the SSD device 200, the controller 228 may be configured to access the mapping table 226 to determine the physical memory address(es) corresponding to the logical memory address, to cause reading a compressed block of data from the determined physical memory address(es), to cause the data compressor 222 to decompress the compressed block of data into a decompressed block of data, and to cause provision of the decompressed block of data.

The control portion 220 may comprise further components or portions, e.g. a data buffer accessible by the controller for temporary storage of e.g. the mapping table, compressed or to be compressed data, decompressed or to be decompressed data, etc. The data buffer may comprise e.g. one or more DRAM memory units or volatile or non-volatile memory units of other type. The control portion may further comprise e.g. an error correction portion for ensuring integrity of stored data. The error correction portion may be configured to apply an error corrective coding based on e.g. Reed-Solomon coding, Golay code(s), Hamming code(s), etc.

The data compressor 222, the wear leveling portion 224 and the controller 228 may be provided as logical or functional portions/modules of one or more physical devices. In particular, the control portion 220 may comprise a processor and a memory, and the data compressor 222, the wear leveling portion 224 and the controller 228 may be provided as software stored in the memory, e.g. as one or more computer programs comprising one or more sequences of one or more instructions that cause the SSD device 200 to perform the operations, procedures and/or functions assigned to the data compressor 222, the wear leveling portion 224 and the controller 228 when executed by the processor. The memory may be further employed to store the mapping table 226 and to provide storage capacity for the data buffer.

Due to compression and/or wear leveling, the physical storage capacity of the SSD device 200 may be different from the logical storage capacity. In particular, compression may enable, at least in theory, providing a physical storage capacity that is smaller than the logical storage capacity. On the other hand, the wear leveling functionality, again at least in theory, may make use of physical storage capacity that is larger than the logical storage capacity—which may be referred to as over provisioning (of storage capacity). The logical storage capacity may be considered as the storage capacity of the SSD device 200 as seen by an entity using the SSD device 200. The logical storage capacity also provides the addressable storage capacity to which a logical memory address refers. In the following, a reference to the storage capacity of the SSD device 200, or of a data storage apparatus in general, refers to the logical storage capacity unless explicitly state otherwise.

Although the term SSD or SSD device may be used as an umbrella term covering an array of devices that utilize some form of solid-state storage, in this document the term SSD or SSD device is used to refer to a mass storage device 200 comprising a storage portion 210 and a control portion 220, as described hereinbefore.

On the other hand, although the SSD device 200 is used as an example of a data storage apparatus 120 with which the data eraser 110 may be employed, the data eraser 110 is equally applicable with other types data storage devices. In particular, while the data eraser apparatus 110 may be especially advantageous in erasing data stored in the SSD device 200 or in another storage device applying compression and/or wear leveling as described hereinbefore, the data eraser 110 is equally applicable for erasing data stored in any data storage apparatus.

In the following, the data eraser 110 is described as a logical entity. In practice the data eraser 110 may be embodied in a number of different ways. The data eraser 110 may be provided as a stand-alone apparatus or as a number of apparatuses configured to perform the operations, procedures and/or functions described hereinafter for the data eraser 110. As another example, the data eraser 110 may be provided as an apparatus or as a number of apparatuses hosted by another apparatus. As a further example, the data eraser 110 may be provided as software means, e.g. as one or more computer programs comprising computer-readable instructions that, when executed by a processor, cause an apparatus to perform the operations, procedures and/or functions described hereinafter for the data eraser 110.

Figure 3:
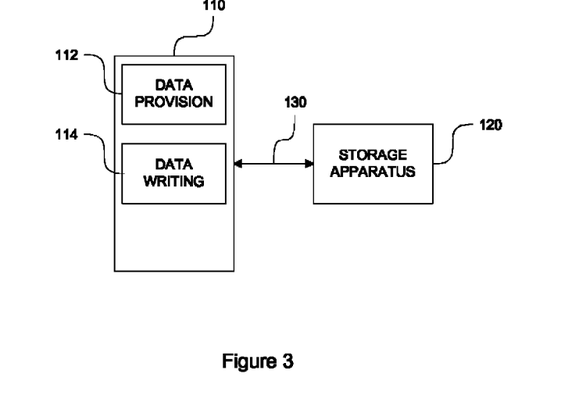
FIG. 3 schematically illustrates an arrangement comprising a data eraser in accordance with an embodiment of the invention.

FIG. 3 schematically illustrates the data eraser 110, connected to the data storage apparatus 120 via the host interface 130. The data eraser 110 comprises a data provision portion 112 and a data writing portion 114. The data storage apparatus 120 may comprise, for example, the SSD device 200 or data storage apparatus of other type applying compression and/or wear leveling as described hereinbefore.

The data provision portion 112 is configured to obtain a sequence of uncompressible data fulfilling predetermined criteria divided into one or more blocks of uncompressible data, the sum of sizes of the one or more bocks of uncompressible data being equal to or larger than the storage capacity of the data storage apparatus 120. The predetermined criteria are preferably, associated with the extent of uncompressibility of the sequence of uncompressible data and hence the extent of uncompressibility of the one or more blocks of uncompressible data, and the predetermined criteria may comprise a single criterion or one or more separate criteria that may be used as an indication of uncompressibility of the one or more blocks of uncompressible data. The predetermined criteria may be determined such that absolute uncompressibility of the one or more blocks of uncompressible data is implied. Alternatively, the predetermined criteria may be determined such that some level of compressibility may be—in theory and/or in practice—possible, while still implying uncompressibility to an extent that it fulfills the predetermined criteria, typically resulting in practical uncompressibility of the respective blocks of data. Consequently, the term uncompressible data as used in this document may refer to absolutely uncompressible data or to data that is uncompressible to an extent that it fulfills the predetermined criteria with respect to its level of uncompressibility.

The sequence of uncompressible data may be provided to the data provision portion 112 as the one or more blocks of uncompressible data or, alternatively, the data provision portion 112 may be configured to obtain uncompressible data e.g. as a continuous stream of data or as a number of data sections and to arrange the stream of uncompressible data or the data sections into the one or more blocks of uncompressible data.

The data writing portion 114 is configured to provide the one or more blocks of uncompressible data to the storage apparatus 120 to be stored therein in order to overwrite the data being currently stored in the data storage apparatus 120. Consequently, the data currently stored in the data storage apparatus 120 is replaced with the one or more uncompressible data blocks and hence erased from the data storage apparatus 120.

In general, the data eraser is configured to provide one or more blocks of uncompressible data in order to overwrite all addressable memory locations of the data storage apparatus 120. While in a general case it may be sufficient to write one or more data blocks of any data having a combined size that is greater than or equal to the storage capacity of the data storage apparatus 120 in order to erase all data being stored therein, this may not be sufficient e.g. in case of the SSD device 200 or in case of any data storage apparatus that may apply compression and/or wear leveling of data to be stored therein due to compression function possibly reducing the amount of data actually written in the physical memory of the data storage apparatus 120 and/or wear leveling function possibly writing the data to be written in a certain logical memory address to a physical memory address not visible outside the data storage apparatus.

Consequently, a benefit of writing one or more blocks of uncompressible data fulfilling the predetermined criteria is to ensure that the compression function, e.g. the data compressor 222, cannot reduce the amount of data actually written in the physical memory of the data storage apparatus 120. On the other hand, a benefit of the one or more blocks of uncompressible data having a combined size that is greater than or equal to the storage capacity of the data storage apparatus 120 is to ensure that all physical memory locations of the data storage apparatus 120 are being overwritten despite the wear leveling function, e.g. the wear leveling portion 224, applying mapping between logical memory addresses and corresponding physical memory addresses in manner typically not known outside the data storage apparatus 120. Consequently, obtaining one or more blocks of uncompressible data having combined size larger than or equal to the storage capacity of the data storage apparatus 120 and providing the one or more blocks to be stored in the data storage apparatus 120 contributes to securely erasing the data being stored in the data storage apparatus 120.

On the other hand, the one or more blocks of uncompressible data—instead of any data—having a combined size that is greater than or equal to the storage capacity of the data storage apparatus 120 is quite naturally equally applicable for overwriting data being stored in a data storage apparatus that does not apply compression and/or wear leveling.

The sequence of data to be used as basis for the one or more blocks of uncompressible data may be obtained as random or pseudo random data by applying a random number generator (RNG) to generate the data sequence. In practice, since a genuinely random process may not be available or application of such a process may be impractical, it is typically sufficient to rely on a pseudo random number generator (PRNG). In this document both the term RNG and the term PRNG are used to refer to random number generators that are typically provided by software means and that are, in essence, PRNGs. Hence, a RNG or a PRNG may be employed to obtain data that is random enough in order to make it practically uncompressible by a lossless compression approach and, in particular, to make it uncompressible by a compressor operating to compress data to be written in the data storage apparatus 120, such as the data compressor 222 of the SSD device 200. Here the term 'lossless compression' refers to compression that can be reversed such that no information is lost in the compression and a subsequent decompression of a block of data.

In practice the data provision portion 112 typically does not have any knowledge of the details of compression applied by the data storage device 120. Consequently, the data provision portion 112 may not be able to exploit properties of the compression approach applied by the data storage device 120 in order to generate data that cannot be compressed at all or that can be compressed only to a predefined extent. Hence, the sequence of random data is preferably divided into blocks of sufficient size exhibiting randomness to an extent making it practically impossible to compress the data using a lossless compression approach.

Truly random data comprising a sequence of random numbers or random characters is an example of such data that cannot be compressed without losing information and hence, in other words, lossless compression of such data is not possible. This can be illustrated by analysis of two rather straightforward axioms referring to high-quality random numbers as random data, as described in the following.

Axiom 1: Lossless compression of high-quality random numbers is possible only if some combinations of data are more likely than others.

Axiom 2: Any string of high-quality random numbers is as likely as any other string Let A denote a set, let $<B_k>$ with $k \epsilon [1 \ldots n]$ compose of all possible strings in A, let R denote a process that picks strings belonging to A randomly, and let $P_k$ be the likelihood of R picking k:th string. If we further assume $P_i$ indicating the likelihood of picking the i:th string being higher than average likelihood of any string in $<B_k>$ being picked by R, Axiom 2 does not hold and, consequently, R is not a high-quality RNG if there is a string that is more likely than other strings belonging to $<B_k>$. Thus, claim that "lossless compression of high-quality random numbers is not possible" is proven by contradiction.

Further in this regard, a pigeonhole principle described e.g. on page 40 of "Fundamentals of Discrete Mathematical Structures" by K. R. Chowdhardy, PHI Learning Private Limited, New Delhi, India, 2008 further illustrates the concept of lossless compression. The pigeonhole principle states that if there are h holes and total p pigeons in these holes and h<p, then there must be some holes with more than one pigeon. That is, if there is a mapping between two finite sets of unequal size, then at least one element in the smaller set must be paired with more than one element in the larger set. The pigeonhole principle may be proven, as indicated by Chowdhardy, by contradiction: if assuming the conclusion of the pigeonhole principle to be false, then we can assume that each pigeonhole contains at most one pigeon. Thus, it accounts for h pigeons or less. However, there are p pigeons, and p>h, which is a contradiction. Hence the mapping rule between the two finite sets of unequal size derived on basis of the pigeonhole principle is correct.

Based on the pigeonhole principle one knows that a compressor applying lossless compression cannot compress data below the limit set by computational entropy, which is the computational analog of Shannon's entropy. In this regard, e.g. on pages 5 to 6 of "A pseudorandom Generator from any One-Way Function" by J. Håstad et al., SIAM Journal on Computing, Vol. 28 Issue 4, August 1999, pages 1364-1396 the computational entropy g(X) is defined to be at least the Shannon entropy of Y if g(X) and Y are computationally indistinguishable. If g(X) is a pseudorandom generator, the computational entropy of g(X) is greater than the Shannon entropy of its input X, and in this sense g( ) amplifies entropy.

This is a useful property of a pseudorandom generator that may be leveraged for developing an approach for generating random data that is uncompressible or essentially uncompressible by any lossless compression approach. On a related note, on page 272 "Minimum Message Length and Kolmogorov Complexity" by C. S. Wallace and D. L. Dowe, The Computer Journal, Vol. 42, No. 4, 1999, pages 270-283 it is noted that the randomness of a finite string is usually assessed by asking whether any standard statistical test would cause us to reject the hypothesis that the string came from a random source, thereby providing a useful tool for assessing randomness, and hence uncompressibility—of data.

As discussed hereinbefore, the data provision portion 112 may be configured to obtain the sequence of random data fulfilling predetermined criteria by employing a PRNG. In particular, obtaining the uncompressible data may comprise employing a random number generator configured to generate a sequence of random or pseudo random data, e.g. random numbers, fulfilling the predetermined criteria, in other words to generate a sequence of random numbers of sufficient randomness. Repeated calls to a PRNG may be issued in order to provide the sequence of random numbers having sufficient length for division into one or more blocks of uncompressible data having combined size larger than or equal to the storage capacity of the data storage apparatus 120. Consequently, the sequence of random data provided by a PRNG that cannot be compressed by a lossless compression approach may be used as basis for one or more blocks of uncompressible data.

An example of a suitable PRNG is described by the following ANSI-C source code, which is also described e.g. on page 2 of "Good Practice in (Pseudo) Random Number Generation for Bioinformatics Applications" by D. Jones, UCL bioinformatics Group, UK, 2010, where this PRNG is referred to as a KISS PRNG. This example is also referred to hereinafter as a first exemplifying PRNG.

```
static unsigned int x = 123456789;
static unsigned int y = 362436000;
static unsigned int z = 521288629;
static unsigned int c = 7654321;
unsigned int KISS( )
{
    unsigned long long t, a = 698769069ULL;
    x = 69069*x+12345;
    y ^= (y<<13);
    y ^= (y>>17);
    y ^= (y<<5);
    t = a*z+c;
    c = (t>>32);
    return x+y+(z=t);
}
```

The first exemplifying PRNG described hereinbefore is a composite random number generator that combines three types of PRNGs. Namely, the first exemplifying PRNG comprises a combination of a Multiply-With-Carry PRNG, Xor-Shift PRNG and a Linear Congruential PRNG, as known in the art. Such a combination of these PRNG types provides a composite PRNG that is capable of producing a period in excess of 10^40000000.

In his paper *Xorshift RNGs* (2003), George Marsaglia presents a "description of a class of extremely fast random number generators . . . that seem to pass tests of randomness very well". The generators are scalable in that they have periods of $2^k-1$ where k=32, 64, 96, 128, 192.

These RNGs work by applying a series of combinations of xorshift operations in a variety of ways. Marsaglia reports that these RNGs perform well when undertaking tests of randomness, passing all of the Diehard battery of tests, as known in the art.

In C programming language a basic Xorshift operation is performed by y^(y<<a) for shifts to the left and y^(y>>a) for shifts to the right. Xorshift RNGs are developed by combining different xorshift operations, using various shifts and different arguments to create a variety of RNGs.

Marsaglia presents the idea of xorshift operations:
"here is the essential part of a C procedure that, with only three xorshift operations per call, will provide 2128-1 random 32-bit integers, given four random seeds x, y, z, w:
    tmp=(x^(x<<15)); x=y; y=z; z=w; return w=(w^(w>>21))
        ^(tmp^(tmp>>4));

Such a procedure is very fast, typically over 200 million/second, and the resulting random integers pass all the tests of randomness that have been applied to them".

An example of a Xorshift RNG, referred to in the following also as a second exemplifying PRNG, by Marsaglia is with a period of $2^{192}-2^{32}$ is provided in the following as ANSI C source code.

```
unsigned long xorwow( )
{
    static unsigned long x=123456789,y=362436069,z=521288629,
        w=88675123,v=5783321, d=6615241;
    unsigned long t;
    t=(x^(x>>2));
    x=y;
    y=z;
    z=w;
    w=v;
    v=(v^(v<<4))^(t^(t<<1));
    return (d+=362437)+v;
}
```

The Mersenne Twister (MT) is an algorithm for generating uniform pseudorandom numbers. According to Matsumoto and Nishimura, in their paper *Mersenne Twister: A 623-dimensionally equidistributed uniform pseudorandom number generator*, the Mersenne Twister exhibits a very large period of $2^{19937}-1$. The MT has been known to pass various tests of randomness, including the Diehard battery of tests known in the art.

Matsumoto and Nishimura explain the algorithm as such:
In the following description, the bold letter X, denotes a word vector, which is a w-dimensional row vector over the finite, two-element binary field $F_2=\{0, 1\}$, identified with machine words of size w (with the least significant bit at the right). The algorithm creates an arrangement of word vectors, which are considered to be uniform pseudorandom integers between 0 and $2^w-1$. Dividing by $2^w-1$, each word vector is regarded as a real number in [0,1]. The following linear recurrence is the basis of the algorithm:

$$X:=X_{k+m} \oplus (X_k^u | X_{k+1}^l) A, (k=0,1,\ldots)$$

We have several constants, an integer n, which is the degree of the recurrence, an integer r (hidden in the definition of $X_k^u$), $0 \leq r \leq w-1$, an integer m, $1 \leq m \leq n$ and a constant w×w matrix A with entries in $F_2$.

We give $X_0, X_1, \ldots X_{n-1}$ as initial seeds. Then, the generator generates $x_n$ by the above recurrence with $k=0$. By putting $k=1, 2, \ldots$, the generator determines $x_{n+1}$, $x_{n+2}, \ldots$.

On the right-hand side of the recurrence, $x_k^u$ means "the upper w−r bits" of $x_k$, and $x_{k+1}^l$ "the lower r bits" of $x_{k+1}$. Thus, if $X=(x_{w-1}x_{w-2}, \ldots, x_0)$ then, by definition, $X^u$ is the w−r bits vector $(x_{w-1}, \ldots, x_r)$, and $X^l$ is the r bits vector $(x_{r-1}, \ldots, x_0)$. Thus $(X_k^u | X_{k+1}^l)$ is just the concatenation; namely, a word vector obtained by concatenating the upper w−r bits of $X_k$ and the lower r bits of $X_{k+1}$ in that order. Then the matrix A is multiplied from the right by this vector.

Finally, add $X_{k+m}$ to this vector ($\oplus$ is bitwise addition modulo two), and then generate the next vector $X_{k+n}$.

The following ANSI-C code presents an example for implementing an MT RNG, as provided in http://www.math.sci.hiroshima-u.ac.jp/~m-mat/MT/MT2002/CODES/mt19937ar.c. This source code is also provided e.g. in the book entitled "Python Tutorial" by Guido van Rossum, 2$^{nd}$ edition, ISBN 978-4-87311-442-2, whereas further information regarding the MT RNG can be found e.g. on page http://www.math.sci.hiroshima-u.ac.jp/~m-mat/MT/emt.html. The MT RNG is also referred to hereinafter as a third exemplifying PRNG.

```
/*
    A C-program for MT19937, with initialization improved 2002/1/26.
    Coded by Takuji Nishimura and Makoto Matsumoto.
    Before using, initialize the state by using init_genrand(seed)
    or init_by_array(init_key, key_length).
    Copyright (C) 1997 - 2002, Makoto Matsumoto and Takuji Nishimura,
    All rights reserved.
    Redistribution and use in source and binary forms, with or without
    modification, are permitted provided that the following conditions
    are met:
          1. Redistributions of source code must retain the above copyright
             notice, this list of conditions and the following disclaimer.
          2. Redistributions in binary form must reproduce the above copyright
             notice, this list of conditions and the following disclaimer in the
             documentation and/or other materials provided with the distribution.
          3. The names of its contributors may not be used to endorse or promote
             products derived from this software without specific prior written
             permission.
    THIS SOFTWARE IS PROVIDED BY THE COPYRIGHT HOLDERS AND CONTRIBUTORS
    "AS IS" AND ANY EXPRESS OR IMPLIED WARRANTIES, INCLUDING, BUT NOT
    LIMITED TO, THE IMPLIED WARRANTIES OF MERCHANTABILITY AND FITNESS FOR
    A PARTICULAR PURPOSE ARE DISCLAIMED. IN NO EVENT SHALL THE COPYRIGHT
    OWNER
OR
    CONTRIBUTORS BE LIABLE FOR ANY DIRECT, INDIRECT, INCIDENTAL, SPECIAL,
    EXEMPLARY, OR CONSEQUENTIAL DAMAGES (INCLUDING, BUT NOT LIMITED TO,
    PROCUREMENT OF SUBSTITUTE GOODS OR SERVICES; LOSS OF USE, DATA, OR
    PROFITS; OR BUSINESS INTERRUPTION) HOWEVER CAUSED AND ON ANY THEORY OF
    LIABILITY, WHETHER IN CONTRACT, STRICT LIABILITY, OR TORT (INCLUDING
    NEGLIGENCE OR OTHERWISE) ARISING IN ANY WAY OUT OF THE USE OF THIS
    SOFTWARE, EVEN IF ADVISED OF THE POSSIBILITY OF SUCH DAMAGE.
    Any feedback is very welcome.
    http://www.math.sci.hiroshima-u.ac.jp/~m-mat/MT/emt.html
    email: m-mat @ math.sci.hiroshima-u.ac.jp (remove space)
*/
#include <stdio.h>
/* Period parameters */
define N 624
define M 397
define MATRIX_A 0x9908b0dfUL      /* constant vector a */
define UPPER_MASK 0x80000000UL    /* most significant w-r bits */
define LOWER_MASK 0x7fffffffUL    /* least significant r bits */
static unsigned long mt[N]; /* the array for the state vector     */
static int mti=N+1; /* mti==N+1 means mt[N] is not initialized */
/* initializes mt[N] with a seed */
void init_genrand(unsigned long s)
{
        mt[0]= s & 0xffffffffUL;
        for (mti=1; mti<N; mti++) {
                mt[mti] =
                        (1812433253UL * (mt[mti-1] ^ (mt[mti-1] >> 30)) + mti);
                /* See Knuth TAOCP Vol2. 3rd Ed. P.106 for multiplier. */
                /* In the previous versions, MSBs of the seed affect      */
                /* only MSBs of the array mt[ ].                          */
                /* 2002/01/09 modified by Makoto Matsumoto                */
                mt[mti] &= 0xffffffffUL;
                /* for >32 bit machines */
        }
}
/* initialize by an array with array-length */
/* init_key is the array for initializing keys */
/* key_length is its length */
/* slight change for C++, 2004/2/26 */
void init_by_array(unsigned long init_key[ ], int key_length)
```

```
{
        int i, j, k;
        init_genrand(19650218UL);
        i=1; j=0;
        k = (N>key_length ? N : key_length);
        for (; k; k--) {
                mt[i] = (mt[i] ^ ((mt[i-1] ^ (mt[i-1] >> 30)) * 1664525UL))
                        + init_key[j] + j; /* non linear */
                mt[i] &= 0xffffffffUL; /* for WORDSIZE > 32 machines */
                i++; j++;
                if (i>=N) { mt[0] = mt[N-1]; i=1; }
                if (j>=key_length) j=0;
        }
        for (k=N-1; k; k--) {
                mt[i] = (mt[i] ^ ((mt[i-1] ^ (mt[i-1] >> 30)) * 1566083941UL))
                        - i; /* non linear */
                mt[i] &= 0xffffffffUL; /* for WORDSIZE > 32 machines */
                i ++;
                if (i>=N) { mt[0] = mt[N-1]; i=1; }
        }
        mt[0] = 0x80000000UL; /* MSB is 1; assuring non-zero initial array */
}
/* generates a random number on [0,0xffffffff]-interval */
unsigned long genrand_int32(void)
{
        unsigned long y;
        static unsigned long mag01[2] = {0x0UL, MATRIX_A};
        /* mag01[x] = x * MATRIX_A for x=0,1 */
        if (mti >= N) { /* generate N words at one time */
                int kk;
                if (mti == N+1) /* if init_genrand() has not been called, */
                        init_genrand(5489UL); /* a default initial seed is used */
                for (kk=0;kk<N-M;kk++) {
                        y = (mt[kk]&UPPER_MASK)|(mt[kk+1]&LOWER_MASK);
                        mt[kk] = mt[kk+M] ^ (y >> 1) ^ mag01[y & 0x1UL];
                }
                for (;kk<N-1;kk++) {
                        y = (mt[kk]&UPPER_MASK)|(mt[kk+1]&LOWER_MASK);
                        mt[kk] = mt [kk+(M-N)] ^ (y >> 1) ^ mag01[y & 0x1UL];
                }
                y = (mt[N-1]&UPPER_MASK)|(mt[0]&LOWER_MASK);
                mt[N-1] = mt[M-1] ^ (y >> 1) ^ mag01[y & 0x1UL];
                mti = 0;
        }
        y = mt[mti++] ;
        /* Tempering */
        y ^= (y >> 11);
        y ^= (y << 7) & 0x9d2c5680UL;
        y ^= (y << 15) & 0xefc60000UL;
        y ^= (y >> 18);
        return y;
}
/* generates a random number on [0,0x7fffffff]-interval */
long genrand_int31(void)
{
        return (long)(genrand_int32()>>1);
}
/* generates a random number on [0,1]-real-interval */
double genrand_real1(void)
{
        return genrand_int32()*(1.0/4294967295.0);
        /* divided by 2^32-1 */
}
/* generates a random number on [0,1)-real-interval */
double genrand_real2(void)
{
    return genrand_int32()*(1.0/4294967296.0);
    /* divided by 2^32 */
}
/* generates a random number on (0,1)-real-interval */
double genrand_real3(void)
{
        return (((double)genrand_int32()) + 0.5)*(1.0/4294967296.0);
        /* divided by 2^32 */
}
/* generates a random number on [0,1) with 53-bit resolution*/
double genrand_res53(void)
{
        unsigned long a=genrand_int32()>>5, b=genrand_int32()>>6;
```

```
        return(a*67108864.0+b)*(1.0/9007199254740992.0);
}
/* These real versions are due to Isaku Wada, 2002/01/09 added */
int main(void)
{
        int i;
        unsigned long init[4]={0x123, 0x234, 0x345, 0x456}, length=4;
        init_by_array(init, length);
        printf("1000 outputs of genrand_int32()\n");
        for (i=0; i<1000; i++) {
            printf("%10lu ", genrand_int32());
            if (i%5==4) printf("\n");
        }
        printf("\n1000 outputs of genrand_real2()\n");
        for (i=0; i<1000; i++) {
            printf("%10.8f ", genrand_real2());
            if (i%5==4) printf("\n");
        }
        return 0;
}
```

Another example of a sequence of uncompressible data fulfilling the predetermined criteria suitable for division into one or more blocks of uncompressible data is a sequence of pre-compressed data. Hence, instead of or in addition to employing a PRNG, obtaining the sequence of uncompressible data may comprise employing a data compressor for compressing source data to generate the sequence of uncompressible data fulfilling the predetermined criteria. The source data may be basically any data, for example data obtained by employing a PRNG. A PRNG employed to provide the source data typically does not need to provide a sequence of data fulfilling stringent requirements but a standard random number generator provided e.g. in standard libraries of many programming languages typically suffices for this purpose.

The data compressor may be configured to compress source data according to one or more predetermined rules to generate a sequence of compressed data useable as the sequence of uncompressible data. The one or more predetermined rules define the employed compression approach. Advantageously, the compression approach may be similar or partially similar to that employed by the data storage apparatus 120, thereby effectively removing any redundancy from the source data that the compression approach employed by the data storage apparatus 120 could make use of in a subsequent compression. However, application of a compression approach different from that applied in the data storage apparatus 120 is equally applicable, since compression approaches serve to reduce or remove redundancy from data and, consequently, data compressed by any proper compression approach of a given type is typically not significantly further compressible by a compression approach of a different type.

An example of a suitable data compressor is Zlib, see e.g. http://www.zlib.net. Zlib is a lossless data-compression library which implements the Deflate algorithm and is portable across platforms. Deflate is a lossless compression algorithm based on a combination of the LZ77 algorithm and Huffman coding. The Deflate algorithm achieves compression by locating and matching repeating strings with pointers and replacing commonly used symbols with shorter representations, while less commonly used symbols are replaced with longer representations. Zlib's developers claim that the typical compression ratios can vary between 2:1 and 5:1, however trade-offs can be made between speed and compression and different strategies can be employed, depending on the data to be compressed. Zlib is used by many software platforms, including Mac OSX and Linux.

Another example of a suitable data compressor is BZip2. BZip2 is a compression library that compresses files or other data using various techniques, which occur in order during compression and then reverse order during decompression. The compression performed by BZip2 is done in data blocks between 100 and 900 kB in size. Initially Run Length Encoding (RLE) is employed to store runs of data as single values. Then Burrows-Wheeler Transform (BWT) is applied, using a reversible transformation on a block of data. Compression does not occur during the transform but instead the data is modified to in a way to make it easier to compress with a complementary algorithm. After using BWT to convert frequently-recurring character sequences into strings of identical letters, it then applies Move-to-Front transform to place the symbols into an indexed array. Huffman coding is then employed to express the most common source symbols using shorter strings of bits, thus compressing the size of the file The predetermined criteria associated with the sequence of uncompressible data fulfilling the predetermined criteria usable as basis for providing the one or more blocks of uncompressible data may comprise a statistical measure indicative of uncompressibility and/or randomness of the sequence of uncompressible data falling below a predetermined threshold or exceeding a predetermined threshold, depending on characteristics of the measure. In contrast, an equivalent approach may employ a statistical measure indicative of compressibility and/or the level of predictability of the sequence of uncompressible data and the predetermined criteria may comprise such statistical measure falling below a predetermined threshold or exceeding a predetermined threshold, depending on characteristics of the measure. In particular, the predetermined criteria may comprise the statistical measure derived on the basis of the sequence of uncompressible data, e.g. on the basis of one or more randomly selected segments or one or more predetermined segments of the sequence of uncompressible data exceeding (or not exceeding) the respective predetermined threshold. The predetermined criteria are, typically, equally applicable to uncompressible data obtained from a PRNG, from a data compressor or from some other source of uncompressible data.

There exist a number of statistical tests that can be applied to a sequence in an attempt to evaluate it and determine the level of randomness. The American National Institute of Standards and Technology (NIST) have developed a battery of statistical measurements aimed at demonstrating the level of randomness offered by (P)RNGs. NIST defines randomness as "a probabilistic property; that is, the properties of a random sequence can be characterized and described in terms of probability. The likely outcome of statistical tests, when applied to a truly random sequence, is known a priori and can be described in probabilistic terms."

With regard to statistical testing, NIST add "In practice, the reason that statistical hypothesis testing works is that the reference distribution and the critical value are dependent on and generated under a tentative assumption of randomness. If the randomness assumption is, in fact, true for the data at hand, then the resulting calculated test statistic value on the data will have a very low probability (e.g., 0.01%) of exceeding the critical value. On the other hand, if the calculated test statistic value does exceed the critical value (i.e., if the low probability event does in fact occur), then from a statistical hypothesis testing point of view, the low probability event should not occur naturally. Therefore, when the calculated test statistic value exceeds the critical value, the conclusion is made that the original assumption of randomness is suspect or faulty. In this case, statistical hypothesis testing yields the following conclusions: reject $H_0$ (randomness) and accept $H_a$ (non-randomness).

In discussing the output (P-values) of the test suite, NIST declare "For these tests, each P-value is the probability that a perfect random number generator would have produced a sequence less random than the sequence that was tested, given the kind of non-randomness assessed by the test. If a P-value for a test is determined to be equal to 1, then the sequence appears to have perfect randomness. A P-value of zero indicates that the sequence appears to be completely non-random. A P-value 0.01 would mean that the sequence would be considered to be random with a confidence of 99%. A P-value <0.01 would mean that the conclusion was that the sequence is non-random with a confidence of 99%."

The test suite consists of a variety of different tests that are the result of collaboration between Computer Security and Statistical Engineering divisions at NIST. In the following, three examples with detailed descriptions of the test methodology are provided.

Hence, a suitable approach for determining the level of uncompressibility may comprise performing a statistical test with the null hypothesis assuming that the sequence of uncompressible data is actually non-random and hence predictable and/or compressible to some extent. Consequently, a P-value exceeding a predetermined threshold as outcome of such a statistical test serves to indicate that the sequence of compressible data is uncompressible to a sufficient extent. In the following examples the predetermined threshold is set to 0.01, thus indicating uncompressibility with 99% confidence level. However, a different threshold value may be employed without departing from the scope of the present invention in order to apply a different confidence level in view of the desired extent of guaranteed uncompressibility of data.

As a first example of statistical test that may be employed to determine a statistical measure that may be employed as the predetermined criteria indicative of uncompressibility of the sequence of uncompressible data, the Overlapping Template Matching Test is provided. This test is designed to search for a specified pattern of an arbitrary length from a sequence of data. The sequence of data is analyzed bit by bit to see how often a pattern reoccurs within the bit stream. The purpose of the test is to determine if the sequence of data is aperiodic. Compressible/non-random bit streams will exhibit matching patterns, and will subsequently produce P values below the 0.01 threshold.

The Overlapping Template Matching Test may be described e.g. with the following steps from (a) to (f), described also e.g. in a document entitled "*A Statistical Test Suite for Random and Pseudorandom Number Generators for Cryptographic Applications*" by NIST. This document may be found e.g. at http://csrc.nist.gov/groups/ST/tookit/mg/documents/SP800-22rev1a.pdf, and it is also referred to by the publication number SP 800-22 Rev. 1a. In the following description of the Overlapping Template Matching Test m denotes the length in bits of the template, n denotes the length of the bit string, denotes the generated sequence of bits, B denotes the m-bit template to be matched, K denotes the number of degrees of freedom, M denotes the length in bits of a substring of $\epsilon$ to be tested, and N denotes the number of independent blocks of n.

a) Partition the sequence into N independent blocks of length M.

b) Calculate the number of occurrences of B in each of the N blocks. The search for matches proceeds by creating an m-bit window on the sequence, comparing the bits within that window against B and incrementing a counter when there is a match. The window slides over one bit after each examination, e.g., if m=4 and the first window contains bits 42 to 45, the next window consists of bits 43 to 46. Record the number of occurrences of B in each block by incrementing an array $v_i$ (where i=0, ... 5), such that $v_0$ is incremented when there are no occurrences of B in a substring, $v_1$ is incremented for one occurrence of B, ... and $v_5$ is incremented for 5 or more occurrences of B.

c) Compute values for $\lambda$ and $\eta$ that will be used to compute the theoretical probabilities $\pi_i$ corresponding to the classes of $v_0$.

$$\lambda = (M-m+1)/2^m \eta = \lambda/2.$$

d) Compute where $$X^2(obs) = \sum_{i=0}^{5} \frac{(v_i - N\pi_i)^2}{N\pi_i}$$

$\pi_0$=0.364091, $\pi_1$=0.185659, $\pi_2$=0.139381, $\pi_3$=0.100571, $\pi_4$=0.070432 and $\pi_5$=0.139865 e) Compute $$P\text{-value} = igamc\left(\frac{5}{2}, \frac{X^2(obs)}{2}\right),$$

where igamc( ) denotes an incomplete gamma function, provided e.g. in the Cephes C-language special functions math library, http://www.moshier.net/#Cephes or http://gams.nist.gov/cgi-bin/serve.cgi/Package/CEPHES/.

f) Decision Rule (at the 1% Level): If the computed P-value is smaller than 0.01, then conclude that the sequence is non-random. Otherwise, conclude that the sequence is random.

Consequently, the outcome, i.e. the resulting P-value, of the Overlapping Template Matching Test may be employed as the predetermined criteria with respect to uncompressibility of the sequence of uncompressible data such that the predetermined criteria is fulfilled if the P-value is larger than or equal to 0.01.

As a second example of statistical test that may be employed to determine a statistical measure that may be employed as the predetermined criteria indicative of uncompressibility of the sequence of uncompressible data, the Discrete Fourier Transform (Spectral) Test is provided. The purpose of this test is to detect if a bit stream exhibits periodic patterns by focusing on the peak heights in the Discrete Fourier Transform of the sequence. If repetitive patterns are found close to one another, poor results will be generated and the data would be considered as non-random/compressible.

The Discrete Fourier Transform (Spectral) Test may be described e.g. with the following steps from (a) to (i), described also e.g. in a document entitled "*A Statistical Test Suite for Random and Pseudorandom Number Generators for Cryptographic Applications*" by NIST. In the following description of the Discrete Fourier Transform (Spectral) Test n denotes the length of the bit string, E denotes the sequence of bits being tested and d is the normalized difference between the observed and the expected number of frequency components that are beyond the 95% threshold.

a) The zeros and ones of the input sequence (∈) are converted to values of −1 and +1 to create the sequence $X=x_1, x_2, \ldots, x_n$, where $x_i=2\epsilon_i-1$.

b) Apply a Discrete Fourier transform (DFT) on X to produce: $S=DFT(X)$. A sequence of complex variables is produced, which represents periodic components of the sequence of bits at different frequencies.

c) Calculate $M=modulus(S')\equiv/S'/$, where S' is the substring consisting of the first n/2 elements in S, and the modulus function produces a sequence of peak heights.

d) Compute $$T = \sqrt{\left(\log\frac{1}{0,05}\right)n} = \text{the 95\% peak height threshold value.}$$

Under an assumption of randomness, 95% of the values obtained from the test should not exceed T.

e) Compute $N_0=0.95n/2$. $N_0$ is the expected theoretical (95%) number of peaks (under the assumption of randomness) that are less than T.

f) Compute $N_1$=the actual observed number of peaks in M that are less than T.

g) Compute $$d = \frac{(N_1 - N_0)}{\sqrt{n(.95)(.05)/4}}$$

h) Compute $$P\text{-value} = \text{erfc}\left(\frac{|d|}{\sqrt{2}}\right),$$

where erfc is the ANSI C function contained in the math.h header file and its corresponding mathematical library.

i) Decision Rule (at the 1% Level): If the computed P-value is smaller than 0.01, then conclude that the sequence is non-random. Otherwise, conclude that the sequence is random.

Consequently, the outcome, i.e. the resulting P-value, of the Discrete Fourier Transform (Spectral) Test may be employed as the predetermined criteria with respect to uncompressibility of the sequence of uncompressible data such that the predetermined criteria is fulfilled if the P-value is larger than or equal to 0.01.

As a third example of statistical test that may be employed to determine a statistical measure that may be employed as the predetermined criteria indicative of uncompressibility of the sequence of uncompressible data, the Maurer's Universal Statistical Test is provided. The Maurer's Universal Statistical test is applicable for determining whether or not a data sequence can be significantly compressed without loss of information. Consequently, significantly compressible data sequence is considered to be non-random, whereas, conversely, a data sequence that cannot be significantly compressed is considered to be random. An output value of the Maurer's Universal Statistical Test indicates if the data sequence is random to extent that it cannot be compressed without loss of information, thereby providing an example of a statistical measure indicative of uncompressibility and/or randomness of a sequence of (pseudo random) data.

In other words, the purpose of the Maurer's Universal Statistical Test is to detect whether a binary sequence can be compressed. A sequence that is significantly compressible would be considered non-random. E.g. an output of a RNG should pass this test if the output sequence cannot be compressed. The test involves looking back through the entire sequence while inspecting the number of bits between patterns that match. The test detects whether or not the sequence can be significantly compressed without loss of information.

The Maurer's Universal Statistical Test may be described e.g. with the following steps from (a) to (f), found also e.g. in a document entitled "*A Statistical Test Suite for Random and Pseudorandom Number Generators for Cryptographic Applications*" by NIST. In the following description of the Maurer's Universal Statistical test L denotes the length of each block, Q denotes the number of blocks in the initialization sequence, n denotes the length of the bit string, and ∈ denotes the sequence of bits being tested.

a) The n-bit sequence (∈) is partitioned into two segments: an initialization segment consisting of Q L-bit non-overlapping blocks, and a test segment consisting of K L-bit non-overlapping blocks. Bits remaining at the end of the sequence that do not form a complete L-bit block are discarded. The first Q blocks are used to initialize the test. The remaining K blocks are the test blocks (K=[n/L]−Q).

b) Using the initialization segment, a table is created for each possible L-bit value (i.e., the L-bit value is used as an index into the table). The block number of the last occurrence of each L-bit block is noted in the table (i.e., For i from/to Q, $T_j$=i, where j is the decimal representation of the contents of the $i^{th}$ L-bit block).

c) Examine each of the K blocks in the test segment and determine the number of blocks since the last occurrence of the same L-bit block (i.e., $i-T_j$). Replace the value in the table with the location of the current block (i.e., $T_j$=i). Add the calculated distance between re-occurrences of the same L-bit block to an accumulating $\log_2$ sum of all the differences detected in the K blocks (i.e., sum=sum+$\log_2(i-T_j)$).

d) Compute the test statistic:

$$f_n = \frac{1}{K} \sum_{i=Q+1}^{Q+K} \log_2(i - T_j),$$

where $T_j$ is the table entry corresponding to the decimal representation of the contents of the $i^{th}$ L-bit block.

e) Compute the $$P\text{-value} = \text{erfc}\left(\frac{|f_n - expectedValue(L)|}{\sqrt{2}\sigma}\right),$$

where erfc is the ANSI-C function contained in the math.h header file and its corresponding mathematical library and expectedValue(L) and σ are taken from a table of pre-computed values from the "*Handbook of Applied Cryptography*". Under an assumption of randomness, the sample mean, expectedValue(L), is the theoretical expected value of the computed statistic for the given L-bit length. The theoretical standard deviation is given by $$\sigma = c\sqrt{\frac{\text{variance}(L)}{K}},$$

where $$c = 0.7 - \frac{0.8}{L} + \left(4 + \frac{32}{L}\right)\frac{K^{-3/L}}{15}.$$

f) If the computed P-value is smaller than 0.01, then conclude that the sequence is non-random. Otherwise, conclude that the sequence is random.

Consequently, the outcome, i.e. the computed P-value, of the Maurer's Universal Statistical test may be employed as the predetermined criteria with respect to uncompressibility of the sequence of uncompressible data such that the predetermined criteria is fulfilled if the P-value is larger than or equal to 0.01.

The three examples of statistical tests suitable for assessing uncompressibility of a data sequence are equally applicable for assessing the uncompressibility of a sequence of data originating from a (P)RNG, a sequence of data originating from a data compressor, or a sequence of data originating from a data source of different type.

The data provision portion 112 may be configured to obtain the one or more blocks of uncompressible data from a memory or by reading the sequence of uncompressible data from a memory and dividing the read sequence into one or more blocks of uncompressible data. The blocks of uncompressible data and/or the sequence uncompressible data may be stored in the memory by another process running in parallel or they may be pre-generated and pre-stored pieces of data. The memory may be available for the data provision portion 112 as a component of the data eraser 110, as a component of an apparatus hosting the data eraser or as a component of a separate apparatus accessible by the data provision portion 112.

Alternatively, the data provision portion 112 may be configured to obtain the one or more blocks of uncompressible data by applying a predetermined process or method to generate the sequence of uncompressible data for division into the one or more blocks of uncompressible data. The process or method may comprise employing a PRNG e.g. the first exemplifying PRNG, a second exemplifying PRNG, the third exemplifying PRNG and/or other PRNG considered suitable for provision of the sequence of uncompressible data fulfilling the predetermined criteria or a data compressor configured for provision of the sequence of uncompressible data fulfilling the predetermined criteria, as described hereinbefore.

The one or more blocks of uncompressible data may have equal sizes, or the one or more blocks of uncompressible data may exhibit different sizes. If denoting the sizes of the one or more data blocks by $S_i$, i=1, . . . , n and the storage capacity of the data storage apparatus 120 by C, the requirement of the sum of sizes of the one or more bocks of uncompressible data being equal to or larger than the storage capacity of the data storage apparatus 120 may be formulated as $\Sigma_{i=0}{}^nS_i \geq C$. Whereas basically any block size $S_i$ is applicable, the size $S_i$ of a single block data may be e.g. a suitable size in the range from 512 bytes to 4 Gigabytes. The sizes of the one or more blocks of uncompressible data may be selected in view of the storage capacity C of the data storage apparatus 120 and/or in view of the characteristics or capabilities of the host interface 130. Typically, however, $S_i \ll C$, i.e. blocks of uncompressible data having sizes that are significantly smaller than the storage capacity of the data storage apparatus 120 are employed.

The data eraser 110 may be configured to repeat the operations described hereinbefore for the data provision portion 112 and the data writing portion 114 one or more times in order to guarantee overwriting all physical memory locations of the data storage apparatus 120. Writing a set of one or more blocks of uncompressible data having a combined size being larger than or equal to the storage capacity of the data storage apparatus 120 may be referred to as a (single) overwriting pass. Hence, data erasure process as a whole may comprise one or more overwriting passes.

In this regard, the data provision portion 112 may be configured to obtain one or more further sets of one or more blocks of uncompressible data, the sum of the sizes of the one or more blocks of uncompressible data in each further set being equal to or larger than the storage capacity of the data storage apparatus. The one or more further sets of one or more blocks of uncompressible data are preferably obtained on basis of the same sequence of uncompressible data as used as basis for provision of the initial one or more blocks of uncompressible data. Alternatively, a separate sequence of uncompressible data fulfilling the predetermined criteria, possibly having different characteristics, may be employed as basis of any further set of one or more blocks of uncompressible data. However, each set of one or more blocks of uncompressible data is preferably provided on basis of a single sequence uncompressible data to guarantee retaining sufficient level of uncompressibility over the blocks of a set of one or more blocks of uncompressible data.

Moreover, the data writing portion 114 may be configured to provide to the data storage apparatus 120 the one or more further sets of one or more blocks of uncompressible data, one set at a time, for storage therein to overwrite the data currently being stored in the data storage apparatus 120. In other words, each further set of one or more blocks of uncompressible data provided to the data storage apparatus 120 for storage therein represents a single overwriting pass.

The data writing portion 114 may be further configured to verify successful overwriting of data in the data storage apparatus 120. In this regard, the data writing portion 114 may be configured to compare a selected portion or selected portions of data stored in the data storage apparatus 120 with the respective portions of the one or more blocks of uncompressible data most recently provided for storage therein. The verification may be carried out after the initial provision of the one or more blocks of uncompressible data to the data storage apparatus 120 and/or after provision any one of the one or more further sets of one or more blocks of uncompressible data to the data storage apparatus 120. The verification serves to ensure that the respective portions of the one or more blocks of uncompressible data most recently provided for storage in the storage apparatus are actually stored therein, hence providing an indication of successful overwriting of data previously being stored in the respective portion(s) of the logical memory of the data storage apparatus 120.

The selected portion or the selection portions may comprise a predefined set of one or more portions of the logical memory of the data storage apparatus 120. Alternatively or additionally, the selected portions may comprise one or more randomly selected portions of the logical memory of the data storage apparatus 120 having e.g. fixed or randomly selected sizes, thereby essentially providing a spot check of the success of the data erasing process in view of the data provided for storage in the data storage apparatus 120. As a further example, the selected portion(s) may cover the full storage capacity of the data storage apparatus 120, thereby providing a full verification of the overwriting process. Verification may be considered as successful if all selected portions of data stored in the data storage apparatus are identical to the respective portions of the one or more blocks of uncompressible data most recently provided for storage therein.

The data eraser 110 may be configured to apply a predetermined number, i.e. one or more, overwriting passes. Alternatively, the data eraser 110 may be configured to select the number of overwriting passes in view of the outcome of the verification. As an example, the data writing portion 114 may be configured to verify the successful overwriting after each overwriting pass and to consider the data erasure process to be completed once a predetermined number of overwriting passes resulting in successful overwriting of data in the storage apparatus 120 have been encountered.

In addition to the operations, procedures and/or functions described hereinbefore, the data eraser 110 may be configured to apply further measures to further ensure full erasure of the data stored in the data storage apparatus 120.

As an example, the data eraser 110 may be configured to provide to the data storage apparatus 120 a command that is configured to cause the data storage apparatus 120 to apply an internal process to erase the data currently being stored therein by issuing a firmware level command within the data storage apparatus 120 causing initialization of all user addressable memory locations of the data storage apparatus 120. Such a command may be referred to as a sanitization command, and the command may be issued e.g. by the data writing portion 114. The data writing portion 114 may be further configured to verify the success of the sanitization command, e.g. along the lines described hereinbefore in context of verification of successful overwriting of data in the data storage apparatus 120 by the one or more blocks of uncompressible data. In particular, the verification of the sanitization command may comprise comparing one or more selected portions of data stored in the data storage apparatus 120 with the respective portions of the one or more blocks of uncompressible data provided for storage therein to ensure that the respective portions of the one or more blocks of uncompressible data are not anymore stored therein, hence providing an indication of successful application of the sanitization command.

The format of the sanitization command typically depends on the host interface 130 connecting the data eraser 110 and the data storage apparatus 120. As an example, in case the host interface 130 comprises an ATA interface, the sanitization command may comprise "SECURITY ERASE UNIT" command or "SANITIZE" command set in accordance with the respective interface or protocol. As another example, in case the host interface 130 comprises a SCSI interface, the sanitization command may comprise "FORMAT UNIT" command in accordance with the respective interface or protocol.

The operations, procedures and/or functions assigned to the structural units of the data eraser 110, e.g. to the data provision portion 112 and to the data writing portion 114, may be divided between these portions in a different manner. Moreover, the data eraser 110 may comprise further portions or units that may be configured to perform some of the operations, procedures and/or functions assigned to the data provision portion 112 and/or to the data writing portion 114. On the other hand, the operations, procedures and/or functions assigned to the data provision portion 112 and to the data writing portion 114 may be assigned to a single portion or to a single processing unit within the data eraser 110.

In particular, the data eraser 110 may be provided as an apparatus for erasing data being stored in the data storage apparatus 120, the data erasure apparatus comprising means for obtaining a sequence of uncompressible data fulfilling predetermined criteria divided into one or more blocks of uncompressible data, the sum of the sizes of the one or more blocks of uncompressible data being larger than or equal to the storage capacity of the data storage apparatus, and means for providing, to the data storage apparatus, the one or more blocks of uncompressible data for storage therein to overwrite the data being currently stored in the data storage apparatus.

Figure 4:
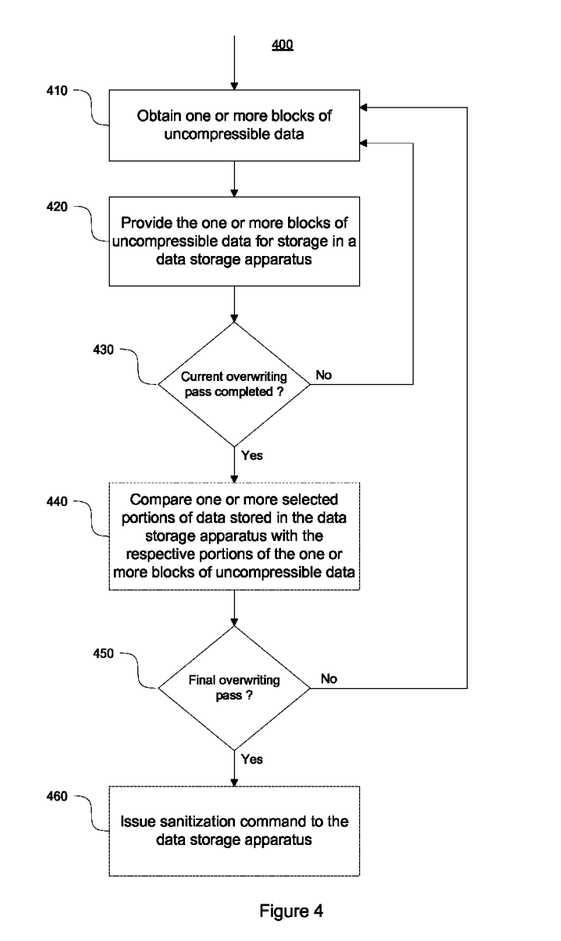
FIG. 4 illustrates a method in accordance with an embodiment of the invention.

The operations, procedures and/or functions described hereinbefore in context of the data eraser 110 may also be expressed in form of a method implementing the corresponding operation, procedure and/or function. As an example in this regard, FIG. 4 illustrates an exemplifying method 400 for erasing data being stored in a data storage apparatus 120. Hence, the method 400 serves as an illustrative example and further methods providing different combination of operations, procedures and/or functions described hereinbefore in context of the data eraser 110 may be provided without departing from the scope of the present invention.

The method 400 comprises obtaining one or more blocks of uncompressible data drawn from a sequence of uncompressible data fulfilling predetermined criteria with respect to its uncompressibility, as described hereinbefore in context of the data provision portion 112 and as indicated in block 410. The predetermined criteria may comprise, for example, one or more statistical measures indicative of uncompressibility of the sequence of data exceeding a predetermined threshold, as described hereinbefore in context of the data provision portion 112. The sequence of uncompressible data may originate, for example, from a random number generator fulfilling predetermined criteria with respect to randomness of random number it provides or from a data compressor applying a predetermined rule to compress, possibly random, source data into the sequence of uncompressible data fulfilling the predetermined criteria in this regard, as described hereinbefore in context of the data provision portion 112.

The method 400 further comprises providing, to the data storage apparatus 120, the one or more blocks of uncompressible data for storage therein in order to overwrite the data being currently stored in the data storage apparatus 120, as indicated in block 420 and described hereinbefore in context of the data writing portion 114.

Consequently, the method 400 may, optionally, further comprise applying, in the data storage apparatus 120, compression to the one or more blocks of uncompressible data to provide corresponding one or more blocks of compressed data to be written and hence stored in the physical memory of the data storage apparatus 120 such that, for each of the one or more blocks of uncompressible data, the size of a block of compressed data is no smaller than the size of the corresponding block of uncompressible data. The method 400 may, optionally, further comprise storing the one or more blocks of compressed data in a physical memory of the data storage apparatus 120. The method 400 may comprise repeating the processing described in blocks 410 and 420 until a sufficient number of blocks of uncompressible data are provided for storage in the data storage apparatus 120 to complete the current overwriting pass. Completing an overwriting pass comprises (obtaining and) providing blocks of uncompressible data for storage in the data storage apparatus 120 such that the combined size of the blocks of uncompressible data is larger than or equal to the storage capacity of the data storage apparatus 120. Hence, the test whether the current overwriting pass has been completed, indicated in block 430, may comprise checking whether the accumulated size of the blocks of uncompressible data provided to the data storage apparatus 120 during the current overwriting pass is larger than or equal to the storage capacity of the data storage apparatus 120. In response to the accumulated size being larger than or equal to the storage capacity of the data storage apparatus 120, the method 400 proceeds to block 440 or 450, whereas in response the accumulated size being smaller than the storage capacity of the data storage apparatus 120, the method 400 proceeds back to block 410.

The method 400 may, optionally, further comprise comparing one or more selected portions of data stored in the data storage apparatus 120 with the respective portions of the one or more blocks of uncompressible data most recently provided for storage therein to verify that the respective portions of the one or more blocks of uncompressible data most recently provided for storage in the storage apparatus 120 are actually stored therein, as indicated in block 440 and described hereinbefore in context of the data writing portion 114.

The method 400 may, optionally, repeat the operations, procedures and/or functions referred to in blocks 410 to 430 or 440. In other words, this corresponds to providing a (predetermined) number of overwriting passes, as described hereinbefore. In particular, the method 400 may comprise checking whether the current overwriting pass is the final one, as indicated in block 450. The checking may comprise, for example, whether a predetermined number of overwriting passes have been completed and/or whether the optional verification referred to in block 440 indicates successful overwriting of the data being previously stored in the data storage apparatus 120, as described hereinbefore in context of the data eraser 110. Consequently, in response the current overwriting pass not being the final one, the method 400 proceeds to block 410 for the next overwriting pass, whereas in response to the current overwriting pass being the final one, the method 400 may either be considered as completed and hence the data being previously stored in the data storage apparatus 120 may be considered as securely overwritten or the method 400 may optionally issue a sanitization command in accordance with the employed host interface 130, as described hereinbefore in context of the data eraser 110 and as indicated in block 460. The sanitization referred to in block 460 may, alternatively or additionally, be carried out e.g. before block 410, between blocks 430 (or 440) and 450, or between blocks 450 and 410.

Figure 5:
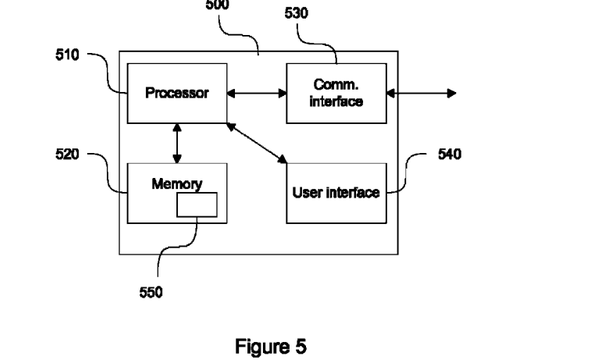
FIG. 5 schematically illustrates an apparatus in accordance with an embodiment of the invention.

FIG. 5 schematically illustrates an exemplifying apparatus comprising a processor 510, a memory 520 and a communication interface 530, such as a network card or a network adapter enabling wireless or wireline communication with another apparatus. The processor 510 is configured to read from and write to the memory 520. The apparatus 500 may further comprise a user interface 540 for providing data, commands and/or other input to the processor 510 and/or for receiving data or other output from the processor 510, the user interface 540 comprising for example one or more of a display, a keyboard or keys, a mouse or a respective pointing device, a touchscreen, etc. The apparatus 500 may comprise further components not illustrated in the example of FIG. 5.

Although the processor 510 is presented in the example of FIG. 5 as a single component, the processor 510 may be implemented as one or more separate components. Although the memory 520 is illustrated as single component, the memory 520 may be implemented as one or more separate components, some or all of which may be integrated/removable and/or may provide permanent/semi-permanent/dynamic/cached storage.

The apparatus 500 may be embodied as a special-purpose or as a general purpose device with a sufficient processing capacity, for example as a mobile phone, a camera, a video camera, a music player, a gaming device, a laptop computer, a desktop computer, a server apparatus, a personal digital assistant (PDA), an internet tablet, a television set, etc. Alternatively, the apparatus 500 may be embodied as an apparatus dedicated for operating as a data eraser 110 described hereinbefore.

The memory 520 may store a computer program 550 comprising computer-executable instructions that control the operation of the apparatus 500 when loaded into the processor 510 and executed by the processor 510. As an example, the computer program 550 may include one or more sequences of one or more instructions. The computer program 550 may be provided as a computer program code. The processor 510 is able to load and execute the computer program 550 by reading the one or more sequences of one or more instructions included therein from the memory 520. The one or more sequences of one or more instructions may be configured to, when executed by one or more processors, cause an apparatus, for example the apparatus 500, to implement the operations, procedures and/or functions described hereinbefore in context of the data eraser 110.

Hence, the apparatus 500 may comprise at least one processor 510 and at least one memory 520 including computer program code for one or more programs, the at least one memory 520 and the computer program code configured to, with the at least one processor 510, cause the apparatus 500 to perform the operations, procedures and/or functions described hereinbefore in context of the data eraser 110.

The computer program 550 may be provided independently of the apparatus, and the computer program 550 may be provided at the apparatus 500 via any suitable delivery mechanism. As an example, the delivery mechanism may comprise at least one computer readable non-transitory medium having program code stored thereon, the program code which when executed by an apparatus cause the apparatus at least implement processing to carry out the operations, procedures and/or functions described hereinbefore in context of the data eraser 110. The delivery mechanism may be for example a computer readable storage medium, a computer program product, a memory device a record medium such as a CD-ROM, a DVD, a corresponding optical media, an article of manufacture that tangibly embodies the computer program 550, etc. As a further example, the delivery mechanism may be a signal configured to reliably transfer the computer program 550.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A data erasure apparatus for erasing data being stored in a data storage apparatus, the data erasure apparatus comprising:
    a data provision portion configured to obtain a sequence of uncompressible data fulfilling predetermined criteria, said predetermined criteria comprised of a P-value derived on basis of the sequence of uncompressible data using a predetermined statistical test indicative of compressibility of the data exceeding a predetermined threshold,
    wherein a null-hypothesis is that the sequence of uncompressible data is non-random, and
    wherein the sequence of uncompressible data is divided into one or more blocks of uncompressible data, the sum of sizes of the one or more blocks of uncompressible data being larger than or equal to an addressable storage capacity of the data storage apparatus; and
    a data writing portion configured to
        provide, to the data storage apparatus, the one or more blocks of uncompressible data for storage therein to overwrite the data being currently stored in the data storage apparatus,
        issue to the data storage apparatus, following a provision of said one or more blocks of uncompressible data, a firmware level sanitization command that is arranged to cause initialization of all user addressable memory locations of the data storage apparatus, and
        compare, after issuance of the firmware level sanitization command, one or more selected portions of data stored in the data storage apparatus with respective portions of the one or more blocks of uncompressible data most recently provided for storage in the data storage apparatus to verify that the respective portions of the one or more blocks of uncompressible data most recently provided for storage in the storage apparatus are not anymore stored therein, thereby providing an indication of successful application of the firmware level sanitization command.

2. The apparatus according to claim 1, wherein the predetermined threshold is 0.01.

3. The apparatus according to claim 1, wherein the predetermined statistical test comprises the Overlapping Template Matching Test, the Discrete Fourier Transform (Spectral) Test or the Maurer's Universal Statistical Test.

4. The apparatus according to claim 1, wherein obtaining the sequence of uncompressible comprises employing a random number generator configured to generate the sequence of pseudo random data fulfilling the predetermined criteria.

5. The apparatus according to claim 4, wherein employing a random number generator comprises repeated calls to one of a KISS random number generator, a xorshift random number generator or a Mersenne twister random number generator.

6. The apparatus according to claim 1, wherein obtaining the sequence of uncompressible data comprises employing a data compressor for compressing source data to generate the sequence of compressed data in accordance with a predetermined rule.

7. The apparatus according to claim 6, wherein the source data is obtained by employing a random number generator.

8. The apparatus according to claim 6, wherein the data compressor comprises a Deflate data compressor or a BZip2 data compressor.

9. The apparatus according to claim 1, wherein
    the data provision portion is further configured to obtain one or more further sets of one or more blocks of uncompressible data, the sum of the sizes of the one or more blocks of uncompressible data in each further set being larger than or equal to the addressable storage capacity of the data storage apparatus, and
    the data writing portion is further configured to provide to the data storage apparatus the one or more further sets of one or more blocks of uncompressible data, one set at a time, for storage therein to overwrite the data currently being stored in the data storage apparatus.

10. A system for erasing data, comprising:
    a data storage apparatus containing data to be erased; and
    a data erasure apparatus according to claim 1, the data storage apparatus being configured to
        apply compression to the one or more blocks of uncompressible data to provide corresponding one or more blocks of compressed data, wherein, for each of the one or more compressed blocks of data, the size of a block of compressed data is no smaller than the size of the corresponding block of uncompressible data, and
        store the one or more blocks of compressed data in a physical memory.

11. The system according to claim 10, wherein the data storage apparatus comprises a Solid State Drive.

12. A method for erasing data being stored in a data storage apparatus, the method comprising:
    obtaining a sequence of uncompressible data fulfilling predetermined criteria, said predetermined criteria comprised of a P-value derived on basis of the sequence of uncompressible data using a predetermined statistical test indicative of compressibility of the data exceeding a predetermined threshold, wherein a null-hypothesis is that the sequence of uncompressible data is non-random, and wherein the sequence of uncompressible data is divided into one or more blocks of uncompressible data, a sum of the sizes of the one or more blocks of uncompressible data being larger than or equal to an addressable storage capacity of the data storage apparatus, providing, to the data storage apparatus, the one or more blocks of uncompressible data for storage therein to overwrite the data being currently stored in the data storage apparatus;
    issuing to the data storage apparatus, following a provision of said one or more blocks of uncompressible data, a firmware level sanitization command that is arranged to cause initialization of all user addressable memory locations of the data storage apparatus; and
    comparing, after issuance of the firmware level sanitization command, one or more selected portions of data stored in the data storage apparatus with respective portions of the one or more blocks of uncompressible data most recently provided for storage in the data storage apparatus to verify that the respective portions of the one or more blocks of uncompressible data most recently provided for storage in the data storage apparatus are not anymore stored therein, thereby providing an indication of successful application of the firmware level sanitization command.

13. The method according to claim 12, wherein the predetermined threshold is 0.01.

14. The method according claim 12, wherein the predetermined statistical test comprises the Overlapping Template Matching Test, the Discrete Fourier Transform (Spectral) Test or the Maurer's Universal Statistical Test.

15. The method according to claim 12, wherein obtaining the sequence of uncompressible data comprises employing a random number generator configured to generate the sequence of pseudo random data fulfilling the predetermined criteria.

16. The method according to claim 15, wherein employing a random number generator comprises repeated calls to one of a KISS random number generator, a xorshift random number generator or a Mersenne twister random number generator.

17. The method according to claim 12, wherein obtaining the sequence of uncompressible data comprises employing a data compressor for compressing source data to generate the sequence of compressed data in accordance with a predetermined rule.

18. The method according to claim 17, wherein the source data is obtained by employing a random number generator.

19. The method according to claim 17, wherein the data compressor comprises a Deflate data compressor or a BZip2 data compressor.

20. The method according to claim 12, further comprising:
obtaining one or more further sets of one or more blocks of uncompressible data, the sum of the sizes of the one or more blocks of uncompressible data in each further set being larger than or equal to the addressable storage capacity of the data storage apparatus; and
providing provide to the data storage apparatus the one or more further sets of one or more blocks of uncompressible data, one set at a time, for storage therein to overwrite the data currently being stored in the data storage apparatus.

21. The method according to claim 12, further comprising:
applying, in the data storage apparatus, compression to the one or more blocks of uncompressible data to provide corresponding one or more blocks of compressed data, wherein, for each of the one or more compressed blocks of data, the size of a block of compressed data is no smaller than the size of the corresponding block of uncompressible data; and
storing the one or more blocks of compressed data in a physical memory of the data storage apparatus.

22. The method according to claim 21, wherein the data storage apparatus comprises a Solid State Drive.

23. A computer program recorded on a non-transitory data recording medium readable by an apparatus that comprises one or more processors, the computer program including one or more sequences of one or more instructions which, when executed by the one or more processors, cause the apparatus to perform at least the method according to claim 12.

24. A computer program product, comprising at least one computer readable non-transitory medium having program code stored thereon, the program code being such that, when executed by an apparatus, causes the apparatus to perform at least the method according to claim 12.

* * * * *